United States Patent [19]
Horiguchi et al.

[11] 3,754,656
[45] Aug. 28, 1973

[54] FLOATATION SEPARATORS

[75] Inventors: Tadao Horiguchi; Katsumi Tagomori, both of Yokohama, Japan

[73] Assignee: Kurita Water Industries, Ltd., Hodogaya-ku, Yokohama-shi, Japan

[22] Filed: Sept. 14, 1971

[21] Appl. No.: 180,429

[30] Foreign Application Priority Data

| Nov. 17, 1970 | Japan | 45/101237 |
| Sept. 28, 1970 | Japan | 45/84797 |
| Nov. 12, 1970 | Japan | 45/99670 |
| Nov. 13, 1970 | Japan | 45/99951 |
| Nov. 14, 1970 | Japan | 45/100333 |
| Nov. 17, 1970 | Japan | 45/101234 |

[52] U.S. Cl............... 210/221, 210/521, 209/170, 261/77
[51] Int. Cl. ............................................. B03c 5/02
[58] Field of Search.................. 210/44, 83, 196, 210/200, 209, 221, 519, 521, 522; 209/170

[56] References Cited
UNITED STATES PATENTS

| 3,182,799 | 5/1965 | Krofta | 210/83 |
| 2,307,154 | 1/1943 | Osuna | 127/13 |
| 3,121,680 | 2/1964 | Ciabattari | 210/44 |
| 3,679,056 | 7/1972 | Haymore | 210/221 |

Primary Examiner—Samih N. Zaharna
Assistant Examiner—Robert H. Spitzer
Attorney—Flynn & Frishauf

[57] ABSTRACT

A floatation separator comprises a floatation tank containing a plurality of vertically spaced apart parallel inclined plates for defining a plurality of parallel inclined chambers in which impurities are separated from the water to be treated by floatation. Each inclined chamber is provided with an inlet port for the water to be treated near its upper end and a discharge port for the treated water near the lower end thereof intermediate the upper and lower inclined plates of a chamber.

15 Claims, 7 Drawing Figures

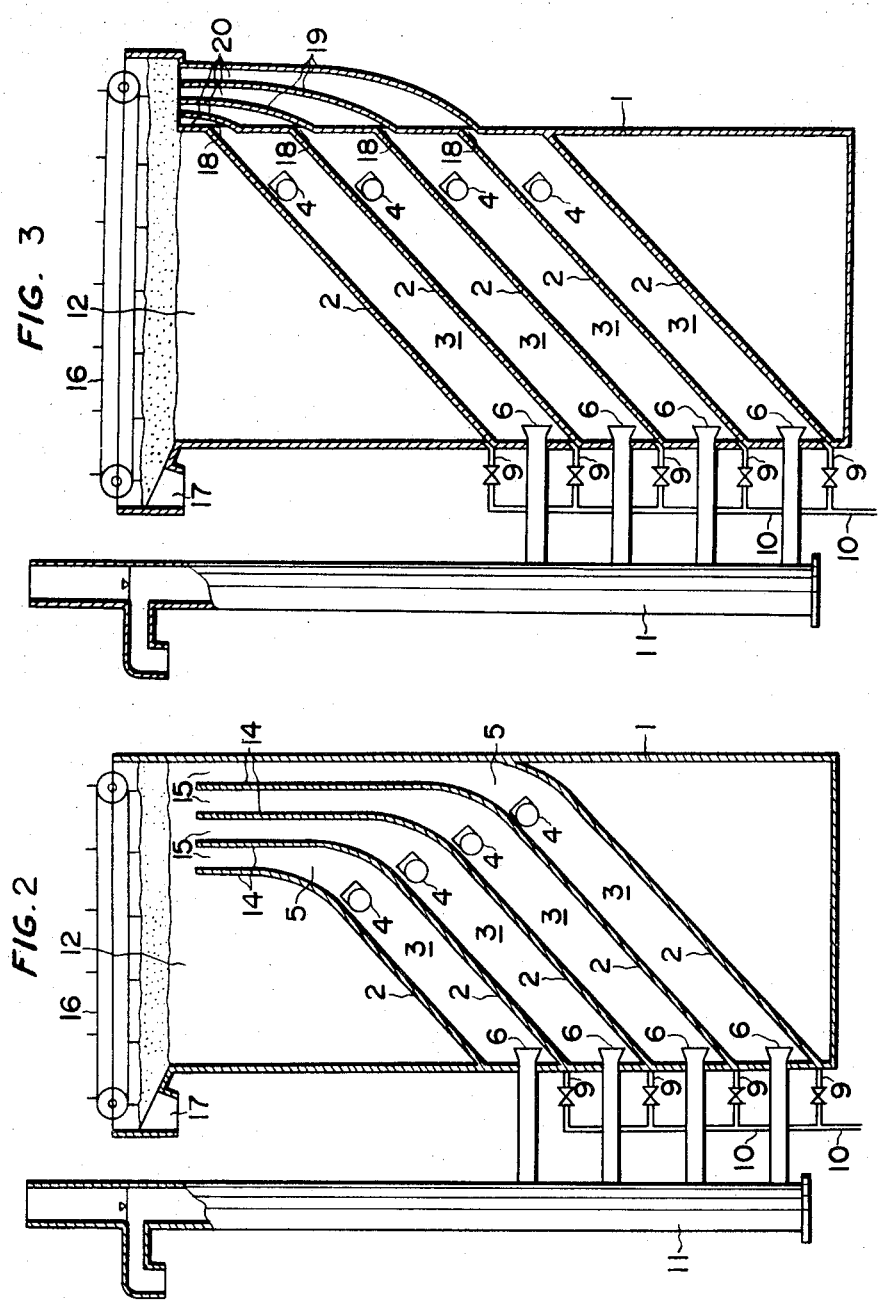

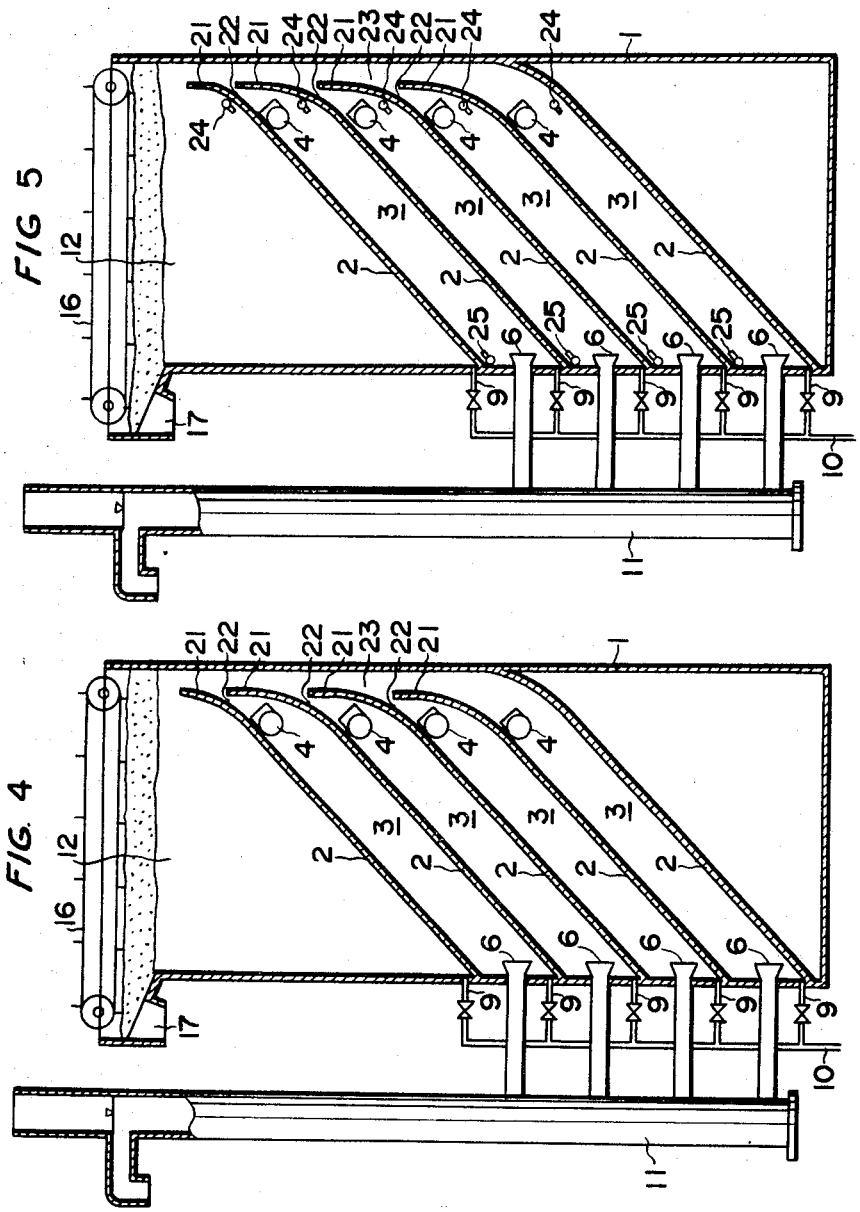

FLOATATION SEPARATORS

BACKGROUND OF THE INVENTION

This invention relates to a floatation separator and more particularly to apparatus for removing impurities contained in water by floatation separation to obtain clear water.

The capability or efficiency of such a floatation separator is determined by treatment capacity which is shown by the quantity of water treated per unit area per unit time. In a floatation separator in order to increase the treatment capacity it is essential to decrease as far as possible the turbulent flow of the water in the floatation chamber caused by the water being treated which is admitted into the chamber and by the flow of water discharged from the chamber. It is also necessary to decrease the turbulent flow or downward flow in the floatation chamber caused by the rising water accompanying floatation of air bubbles or flocks.

Even when such factors that interfere with ideal floatation separation are completely eliminated, the treatment capacity is limited because of the limitation of the inherent floating speed of the flocks. Increase of the treating speed per unit area occupied by the apparatus beyond this limit is made possible by the provision of inclined plates in the apparatus for increasing the floatation area and such apparatus is called an inclined plate type floatation apparatus. With this type of the floatation apparatus the theoretical treating speed per unit area occupied can be thought to increase with the number of flow passages partitioned by the inclined plates. Actually however, in an apparatus provided with about 10 inclined plates the efficiency is only several times higher than the conventional apparatus not equipped with inclined plates. This is because installation of the inclined plates introduces new problems for the floatation separator. One major problem involves the difficulty in the uniform distribution of the water being treated among respective flow passages defined by the inclined plates. In a flow passage which receives a large quantity of the water, the water may reach the exit end of the passage before the solids completely float or the perfect floatation may be prevented by the turbulent flow in the passage for which reason it is obliged to limit the quantity of water introduced into the apparatus. Where the water being treated is admitted at a portion close to the discharge port of the treated water, that is the lower portion of the floatation chamber, there is an advantage that the retention time in the flow passages is prolonged. However, owing to the close installation of the inlet port and the discharge port, the water being treated has a tendency to flow directly to the discharge port. Furthermore, the floating flocks move over a wide area of the floatation chamber, so that the water therein is circulated through the chamber by this movement to flow into respective flow passages, thus rendering it difficult to control the flow of respective liquid phases. For this reason, although three phases, viz. the water being treated containing floatable matters, the water which has been treated and the froths containing the floatable matters are well separated in respective flow passages, they will flow into the upper and lower stages of the flow passages when these phases flow out of the passages, with the result that they are mixed again with another effluent phase, thus decreasing the efficiency of separation of the apparatus.

SUMMARY OF THE INVENTION

It is an object of this invention to provide a new and improved floatation separator which can perform the desired floatation separation without the accompanying difficulties described above.

Another object of this invention is to provide an improved floatation separator including a plurality of parallel inclined floatation chambers in which an inlet port for the water being treated, a discharge port for the treated water and a discharge port for the froths are provided in each inclined chamber such that the froths separated from the water by floatation can flow freely toward the froth discharge port without being entrained in the flow of the water.

A further object of this invention is to provide an improved floatation separator of the multi-stage type in which the froths separated in the lower stages are prevented from flowing into upper stages. This can be accomplished by providing an independnet froth floating passage for each inclined floatation chamber.

Yet another object of this invention is to provide an improved coagulation separator in which the contaminants or impurities contained in the water to be treated are coagulated to form flocks before the water is admitted into the floatation separator for improving the efficiency of separation by floatation.

A still further object of this invention is to improve the efficiency of separation of the flocks by injecting fine air bubbles thus causing the flocks to collect on the air bubbles.

In accordance with this invention, there is provided a floatation separator comprising a floatation tank, a plurality of vertically spaced apart parallel inclined plates mounted in the tank for defining a plurality of parallel inclined chambers, an inlet port for the water to be treated which is positioned near the upper end of each inclined chamber close to the upper inclined plate defining the same, a discharge port for the froths which is provided at the upper end of each inclined chamber, and a discharge port for the treated water at the lower end of each inclined chamber.

A substantially vertical guide plate portion extends from the upper end of each of the inclined plates. Where respective vertical guide plates are aligned vertically, a single common froths floating or rising passage is formed whereas where these vertical guide plates are placed in the horizontal direction, a plurality of independent froth floating passages are formed between the froth discharge ports of respective inclined chambers and the upper portion of the floatation tank where the froths are condensed and removed. Alternatively, such froth floating passages may be provided outside the floatation tank. In any case, the froths from the inclined chambers at lower stages are positively prevented from entering the inclined chambers at higher stages. Thus, the phases of the froths and of water which are separated by floatation in respective inclined chambers are clearly separated so that the efficiency of separation of the froths by floatation can be greatly improved.

In accordance with another feature of the invention, there is provided a coagulation tank between the main pipe which feeds the water to be treated and the respective inclined passages and a coagulating agent is admitted into the coagulation tank to convert the contaminants or impurities in the water into flocks. Fine air bubbles are also blown into the inclined passages to collect thereon the flocks thus promoting their buoyancy.

Additionally, pressurized water containing gas or air dissolved therein is also prepared and admitted into respective inclined chambers together with the water to be treated. The gas or air bubbles liberated from this pressurized water are also effective to promote the separation of the froths by floatation.

BRIEF DESCRIPTION OF THE DRAWINGS

FIG. 2 shows a vertical section similar to FIG. 1 showing a modified embodiment of the invention;

FIGS. 3 and 4 show vertical sections similar to FIG. 1 showing still another embodiment of the invention;

FIG. 5 shows a vertical section of another embodiment in which rinsing water tubes and air diffuser tubes are provided in inclined chambers;

Throughout the drawings like or corresponding portions or elements are designated by the same reference numerals.

DESCRIPTION OF THE PREFERRED EMBODIMENTS

Figure 1:
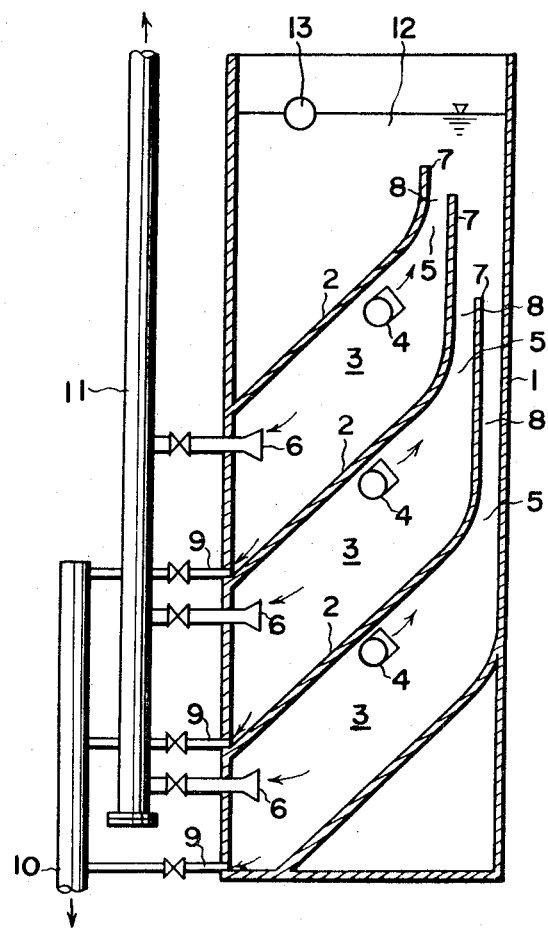
FIG. 1 shows a vertical section of one embodiment of the floatation separator embodying the invention.

With reference first to FIG. 1 of the accompanying drawing, the embodiment of the floatation separator shown therein comprises a floatation tank 1 containing a plurality of inclined chambers 3 defined by a plurality of vertically aligned spaced apart parallel inclined plates 2, inlet ports 4 for the water to be treated which are provided at the upper portion of the respective inclined chambers 3 close to the upper inclined plates 2, discharge ports 5 at the top of respective inclined chambers 3 for discharging separated froths, and discharge ports 6 at the lower end of the inclined chambers for discharging the treated water. The floatation tank 1 preferably has a square or rectangular cross-section of the size determined depending upon the quantity of the water to be treated. The inclined plates 2 are disposed parallel with each other so that the vertical spacing therebetween is substantially uniform. An angle of inclination of the order of 45° is generally preferred but the best angle is selected for a given floatable substance.

At the upper end of each inclined plate 2 is a vertical guide plate 7 to define froth floating passages 8 above the discharge ports 5 for the froths. The lower portion of each inclined chamber 3 is completely closed except for a sludge discharge port 9 leading to a common sludge drain pipe 10. Discharge ports 6 for the treated water are communicated with a pipe 11 for the treated water. The upper end of each froth floating passage 8 is communicated with a concentrating chamber 12 with its upper level opened to the atmosphere and a froth discharge port 13 is opened near the liquid level of the concentrating chamber. Although the inlet ports 4 for the water to be treated are shown to direct the water to flow in parallel with inclined plates 2 they may be opened towards the discharge ports 5 for froths or opened toward the upper part. In any case, it is advantageous to create flow of water to assist the floating of the froths. Each discharge port 6 for the treated water is shown to open at an intermediate point between adjacent inclined plates.

To perform floatation with the apparatus described hereinabove, air bubbles or pressurized water containing dissolved gas are blown into the water to be treated such as sewerage, waste water and sludge, which is incorporated or not incorporated with a coagulation agent to form fine air bubbles in the water which is then admitted uniformly into respective inclined chambers 3 through inlet ports 4. The resulting flocks existing in the water to be treated adhere to air bubbles to form froths. The froths float upwardly through discharge ports 5 and via froth floating passages 8 into concentrating chamber 12 in which they are concentrated and discharged out of the tank through discharge port 13.

The water from which the froths have been separated in the manner as above described descends at a low speed and flows out into pipe 11 as clean treated water via discharge ports 6. At portions in each inclined chamber 3, beneath inlet port 4, some of the froths accompanied by the descending water tend to float upwardly and some of the sludges tend to precipitate, but there is formed no turbulent flow and circulation of the water. In other words, the water flows uniformly towards the bottom, thus producing clean treated water. Most of the froths float upwardly to be discharged but only a small portion thereof precipitates to be discharged through sludge discharge port 9 and pipe 10. The purpose of vertical guide plates 7 is to isolate respective froth floating passages 8 to prevent the froths in the inclined chambers at lower stages from flowing into inclined chambers at higher stages, thus increasing the efficiency of separation. With the illustrated apparatus, since the water to be treated flows upwardly along inclined plates at relatively high levels in a plurality of independent inclined chambers defined by the inclined plates and since the distance of movement of the froths is relatively short, the quantity of the water that is caused to move by the floating movement of the froths is relatively small so that no circulation of the water in the inclined chambers will result. Consequently, the froths float up efficiently because there is no tendency of the froths to flow downwardly together with the downwardly moving water. Thus, most of the froths contained in the water to be treated which has been admitted into the inclined chambers through inlet port 4 is accumulated at the upper portions of the inclined plates in a relatively short time. The water containing remaining froths gradually moves toward the discharge port 6 during which froths having smaller size and smaller buoyancy complete floatation to produce clean water which is discharged through discharge ports 6. Since the spacing between adjacent inclined plates 2 is small as in the conventional design, the froths can readily reach the lower surfaces of the upper inclined plates and are separated from the flow of water thus decreasing the floating time. Accordingly the capacity of the apparatus is improved correspondingly.

The froths that have reached the lower surface of the upper inclined plate of each inclined chamber then move upwardly along the inclined surface to gather at the uppermost portion of the inclined chamber. Thereafter, the froths float upwardly into the concentrating chamber 12 at the upper portion of the apparatus through froth floating passages 8.

As above described, since in the novel floatation separator, the inlet port for the water to be treated, the discharge port for the treated water and the discharge port for the froths are provided in each of the inclined chambers defined by the inclined plates, in such positions and directions that does not cause any turbulent flow, various phases separated in respective inclined chambers flow independently without the fear of being mixed again. For this reason, the treating ability of each inclined floatation chamber is greatly improved when compared with the prior art floatation separation apparatus.

Moreover, since the number of vertically stacked stages of the floatation chambers can be increased with the quantity of water to be treated, it is possible to increase the capacity of the apparatus per unit floor area thereof by a factor of 10 or more when compared with that of the prior art apparatus. To demonstrate this, one example of the result of experiments is shown hereinbelow. With regard to a single inclined chamber, where the inlet port for the water being treated was positioned, at the upper portion of the chamber, the treatment capacity (the quantity of water treated per unit area occupied by the apparatus) was found to be 13.0 m/hr, and the percentage of removal of the solids was 98 percent. These data should be compared with the treatment capacity of 2.7 m/hr and the percentage of removal of the solids of 94 percent which were obtained when the inlet port was positioned at the lower portion. Where three stages of the inclined floatation chambers were used but where guide plates 7 were omitted, a treatment capacity of 40.6 m/hr and the percentage of removal of 98 percent were obtained whereas with the illustrated apparatus these data were improved to 51.5 m/hr and 98 percent, respectively, showing a substantial improvement in the treating efficiency.

The modification shown in FIG. 2 is substantially identical to that shown in FIG. 1 except for a different arrangement of the guide plates 14 and the froth floating passages 15. More particularly, instead of utilizing guide plates of different height, the upper ends of all guide plates 14 terminate at the same level in the concentrating chamber 12 so as to completely isolate respective froth floating passages 15. A horizontal skimmer 16 is provided near the upper level in the floatation tank 1 to discharge collected froths through a discharge port 17 for the froths. With this construction, it is possible to completely prevent the froths from the lower stages from flowing into the inclined chambers 3 at the upper stages. Thus, the froths in respective chambers can freely float up without being influenced by the downward flow of the water whereby the efficiency of separation can be improved.

It should be understood that the arrangement of the guide plates and the froth floating passages can be modified in various ways. FIGS. 3 and 4 illustrate other arrangements. In the embodiment shown in FIG. 3, guide plates 19 are provided on the outside of tank 1 at the upper portion thereof to guide froths separated in respective inclined chambers 3 to the upper portion of the tank 1 through openings 18 at the side thereof and a plurality of substantially vertical froth floating passages 19. With this modification, it is possible to equalize the length of all inclined chambers 3 thus assuring equal efficiency of separation in all chambers.

In the modified embodiment shown in FIG. 4, a curved guide plate 21 is formed at the upper end of each inclined plate 2 and the upper end of each guide plate 21 is terminated close to the lower surface of the curved guide plate positioned thereabove to form a narrow exit port 22 for the separated froths. The vertical portions of respective guide plates are aligned in the vertical direction to form a common froth floating passage 23 of uniform cross-section between these vertical portions and one side wall of tank 1. This embodiment is advantageous in that it is possible to form a plurality of inclined floatation chambers 3 of the same size and same length by using the inclined plates and guide plates of the same size and of the same configuration. By connecting the inclined chambers to the common froth floating passage through narrow exit port 22 it is possible to completely prevent the froths from the lower stages from flowing into the inclined chambers at higher stages. Moreover, the froths can rise freely without being influenced by the downward flow of the water. In the embodiments shown in FIGS. 1 and 2, wherein independent froth floating passages are provided for different inclined chambers, the inclined chambers have different lengths. More particularly, the upper chambers have shorter lengths with the result that their efficiency of separation decreases toward the upper part. In contrast, with the construction shown in FIG. 4, the length of all inclined chambers is made equal by the provision of a common vertical froth floating passage 23, thus equalizing and improving the efficiency of separation in respective chambers.

The modification shown in FIG. 5 is substantially identical to that shown in FIG. 4 except that rinsing water pipes 24 positioned close to the lower inclined plates near the upper ends of the inclined chambers 3 for ejecting rinsing water toward the lower part. Further, at the lower end of each chamber, an air diffuser 25 is positioned near the upper inclined plate to eject air bubbles toward the upper part. As the separation by floatation is continued, a portion of the precipitated sludge or floated froth will come to deposit on the upper or lower surface of the inclined plates and such deposited sludge or froths peel off from time to time to be entrained in the flow of the water being treated. In this embodiment, however, since there are provided rinsing water pipes 24 at the upper ends of the inclined chambers 3 and air diffuser 25 at the lower ends thereof it is possible to clean the inclined chambers. To this end, after the admission of the water to be treated into the inclined chambers has been interrupted air under pressure is ejected through air diffuser 25 to remove the froths deposited on the lower surfaces of the inclined plates 2. Thereafter, rinsing water is ejected through rinsing water pipes 24 to drain the sludge through discharge port 9 and drain pipe 10. By performing intermittently this cleaning operation, it is possible to stabilize the operation of the apparatus.

Figure 6:
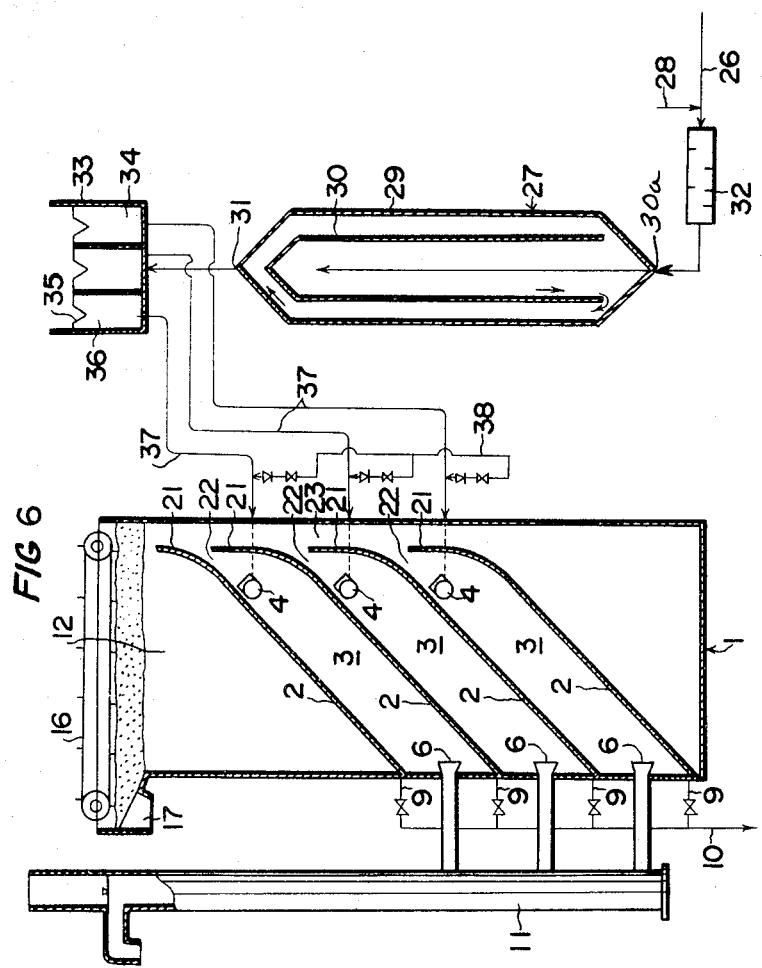
FIG. 6 is a diagram to show the connection between a coagulation tank and a distribution tank associated with the floatation tank.
Figure 7:
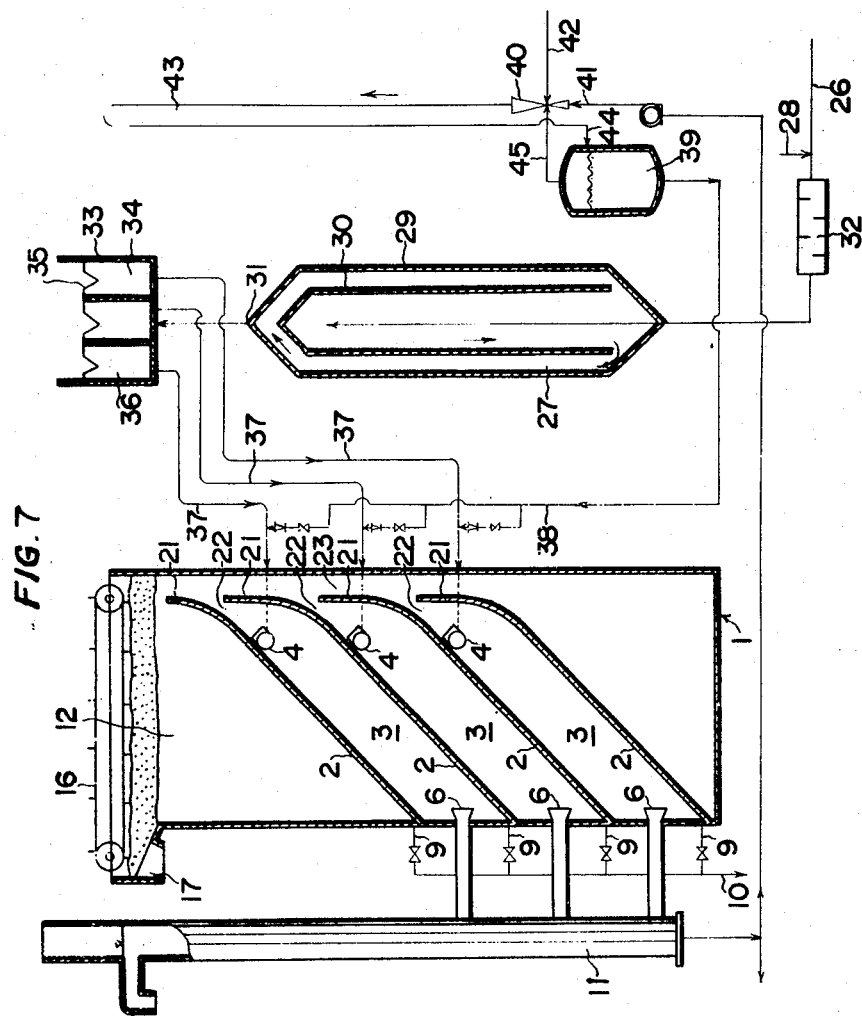
FIG. 7 is a diagram showing the detail of the air supply pipe connected to the inlet pipe for the water to be treated.

Turning now to FIGS. 6 and 7, there is shown an improved control system suitable for use in combination with any one of the embodiments shown in FIGS. 1 to 5. More specifically, there are provided means for causing the water to be treated and admitted into tank 1 through inlet pipes 4 to undergo a coagulation reaction for converting all contaminants into floatable flocks and means for concurrently admitting pressurized water containing gas or air dissolved therein to form fine gas bubbles which are effective to collect the flocks, thus improving the efficiency of removal. In FIGS. 6 and 7, the construction of the floatation tank 1 per se is identical to that already described in connection with FIGS. 1 – 5.

In the embodiment shown in FIG. 6, there are provided a main pipe 26 for feeding the water to be treated, a chemical injection tube 28 connected thereto and a coagulation tank 27 connected to main pipe 26 via a coagulation mixer having a tortuous passage. The coagulation tank 27 comprises an outer cylinder 29, an inner cylinder 30 having a closed upper end and a water inlet pipe 30a extending vertically to the closed upper end of the inner cylinder 30. The lower end of the inner cylinder is spaced apart from the bottom of the outer cylinder to define a flow passage and an exit port 31 is formed at the top of the outer cylinder. It should be understood that the construction and arrangement of coagulation tank 27, chemical injection pipe 28 and coagulation mixer 32 are not limited to the particular ones illustrated in the drawing and that any one of well known coagulation tanks can also be used provided that the impurities can react with the coagulation agent added into the water being treated. It is also to be understood that the coagulation tank may contain a chemical injection means and a mixer.

The exit port 31 of the coagulation tank 27 is connected to a distributor tank 33 which comprises an inlet chamber not shown and a distributing chamber 34 of the same number as the inclined chambers 3 in the floatation tank 1. The inlet chamber and the distributing chambers 34 are communicated with each other by means of a partition wall provided with a plurality of V shaped notches. When the distributor tank 33 is mounted at a higher level than the floatation tank 1, it is possible to supply the water to be treated to the floatation tank by utilizing the difference in liquid heads. However, the distributor tank may be located at a lower level in which case a suitable pump is used. Distributing chambers 34 of the distributor tank 33 are connected to corresponding inclined chambers 3 through inlet pipes 37, respectively, which are connected to a gas supply pipe 38. The opposite end of gas supply pipe 38 is connected to a gas mixing or dissolving device (see FIG. 7 to be described later) for admitting into the inclined chambers pressurized water containing gas mixed or dissolved therein.

In operation, a suitable coagulation agent is added into the water to be treated such as sewerage, waste water or sludge through chemical injection pipe 28. The mixture is uniformly agitated and mixed while it passes through the coagulation mixer 32 and thence admitted into the coagulation tank 27. While the mixture flows downwardly and then upwardly through the coagulation tank the coagulation agent will react with the impurities contained in the water thus converting them into floatable flocks. The water containing the resulting flocks is admitted into respective inclined chambers 3 via distributor tank 33 and inlet pipes 37. The pressurized water containing dissolved gas is introduced into respective inlet pipes 37 so that the mixture of the water being treated and the pressurized water is uniformly admitted into respective inclined chambers 3. Under these conditions, the interior of the floatation tank 1 is maintained at the atmospheric pressure, so that the pressure of the pressurized water is relieved to form fine gas or air bubbles. Consequently, the flocks adhere to the air bubbles to form floatable froths. These froths float upwardly through froth floating passage 23, concentrated in the concentrating chamber 12 and are finally discharged outwardly through discharge port 17 by the action of skimmer 16, as has been described above.

In this embodiment, although the inlet ports 4 for the water being treated are closely positioned in the floatation tank 1 with respect to the froth discharge ports 22, since the coagulation agent is added to the water and the coagulation reaction occurs in the coagulation tank 27 before the water is admitted into the floatation tank, there is no fear that unreacted impurities are introduced into the floatation tank but instead they are converted into flocks so that it is possible to improve the operating efficiency of the floatation tank. Moreover, as the water that has already undergone the coagulation reaction is distributed uniformly among respective inclined chambers through the action of the distributor tank 33 each inclined chamber can operate at its optimum efficiency.

In this embodiment, since the coagulation tank 27 takes the form of a cylindrical tank and since the distributor tank 33 is located above tank 27, addition thereof to the multi-stage type floatation tank does not result in any substantial increase in the space of installation, thereby providing a compact unit using a small amount of floor space.

The embodiment shown in FIG. 7 is substantially identical to that shown in FIG. 6 except that the other end of the pipe 38 for supplying pressurized water containing air or gas dissolved therein is connected to a gas separating tank 39.

The pressurized water containing dissolved gas is prepared by means including an ejector 40, a pipe 41 for feeding water to the ejector 40, a gas supply pipe 42 communicated with the negative pressure portion of the ejector, a vertical tube 43 for extracting the mixture of the gas and water from the ejector and the gas separating tank 39 connected to the opposite end of the vertical tube 43. The opposite end of feed water pipe 41 is connected to pipe 11 for the treated water to utilize a portion thereof. However, the feed water pipe 41 may be connected to another source of water, for example to the main pipe 26. The vertical pipe 43 connected to the output of ejector 40 may take the form of a hair pin. Preferably, the length of pipe 43 should be more than 4 meters because the gas should be completely dissolved in the water while it passes through pipe 43. The opposite end of this pipe is connected to gas separating tank 39 and it is preferable to connect horizontally the end of pipe 43 as at 44 for separating surplus gas from water thus decreasing the retention time of the gas in tank 39. The upper end of gas separating tank 39 is connected to the negative pressure side of ejector 40 through a gas return pipe 45. The bottom of gas separation tank 39 is connected to respective pipes 37 for admitting the water to be treated via pipe 38.

In operation, the water supplied through main pipe 26 is admitted into respective inclined chambers 3 in the manner already described in connection with FIG. 6. A portion of the treated water is supplied from pipe 11 to ejector 40 via pump 46 and pipe 41 to mix the water with the gas or air supplied through pipe 42 under pressure. The gas or air is dissolved in the water while it passes through vertical pipe 43. Surplus gas is separated from the water in gas separating tank 39 and then returned to ejector 40 to be used again. The pressurized water containing gas or air dissolved therein is supplied to inlet pipes 37 through pipe 38 so as to be mixed with the water to be treated. The mixture is then admitted into respective inclined chambers 3 through inlet ports 4.

In the gas dissolving device described above, since gas is dissolved in water in the vertical tube connected to the output of the ejector, the gas is dissolved at a higher efficiency than the conventional gas dissolving system. Moreover, since the gas separating tank is required to separate only surplus gas it is possible to reduce the size of the tank, thus reducing the floor space requirement of the entire apparatus.

While the invention has been described in terms of some preferred embodiments thereof it should be understood that many changes and modifications will be obvious to one skilled in the art without departing from the true spirit and scope of the invention as defined in the appended claims.

We claim:

1. A floatation separator comprising:
   a floatation tank;
   a plurality of vertically spaced apart substantially parallel inclined plates mounted in said tank for defining a plurality of substantially parallel inclined chambers;
   an inlet port for the water to be treated, said inlet port being positioned near the upper end of each inclined chamber close to the upper inclined plate defining each inclined chamber;
   a plurality of upwardly extending guide plates extending from the upper ends of said inclined plates respectively, said guide plates extending upwardly at a steeper angle than said inclined plates, said guide plates defining a discharge port for the froths at the upper end of each inclined chamber, and definining at least one froth floating passage extending between said froth discharge ports and the upper portion of said floatation tank; and
   a discharge port for the treated water at the lower end of each inclined chamber, said treated water discharge port being located intermediate the adjacent upper and lower inclined plates which define a chamber.

2. The floatation separator according to claim 1 comprising a plurality of sludge discharge ports at the lower end of respective inclined chambers, said sludge discharge ports being below the respective treated water discharge ports.

3. The floatation separator according to claim 2 wherein said sludge discharge ports are located adjacent the inclined plates defining the floors of respective inclined chambers.

4. The floatation separator according to claim 1 wherein a plurality of independent froth floating passages are formed outside said floatation tank to connect said froth discharge ports to the upper portion of said floatation tank.

5. The floatation separator according to claim 1 wherein said guide plates are curved and have substantially vertical portions, the vertical portions of said curved guide plates being aligned substantially vertically to define a common froth floating passage, the upper ends of said guide plates terminating close to adjacent ones of said inclined plates to define said froth discharge ports therebetween.

6. The floatation separator according to claim 5 wherein said inclined and guide plates are all substantially identical in size and shape.

7. The floatation separator according to claim 1 wherein a pipe for admitting rinsing water is provided at the upper portion of each inclined chamber and an air diffuser is provided at the lower portion of each inclined chamber.

8. The floatation separator according to claim 1 which further comprises a main pipe for feeding the water to be treated, a coagulation tank connected to said main pipe, means for supplying a coagulation agent for said coagulation tank, a distributor tank connected between said coagulation tank and said inlet ports and means for supplying to said inlet ports pressurized water containing gas or air dissolved therein.

9. The floatation separator according to claim 8 wherein said coagulation tank comprises an outer cylinder and an inner cylinder having a closed upper end, and a pipe connected to said main pipe and extending near the closed upper end of said inner cylinder.

10. The floatation separator according to claim 8 wherein said pressurized water supply means includes a device for dissolving gas or air in pressurized water.

11. The floatation separator according to claim 10 wherein said device comprises an ejector for admixing water and gas, means for supplying pressurized water to said ejector, means for supplying said gas to the negative pressure side of said ejector, a vertical output tube for receiving the mixture of said water and said gas from said ejector, a gas separating tank connected to the opposite end of said vertical pipe, and means for returning the gas separated in said gas separating tank back to said ejector.

12. The floatation separator according to claim 11, wherein said vertical outlet pipe takes the form of a hair pin and said vertical outlet pipe is terminated with a horizontal section at said opposite end connected to said gas separating tank.

13. The floatation separator according to claim 1 wherein said inclined plates are inclined at an angle of about 45°.

14. The floatation separator according to claim 1 wherein said tank is square or rectangular in cross-section.

15. The floatation separator according to claim 1 wherein said guide plates are connected to their respective inclined plates.

* * * * *